United States Patent Office 3,497,526
Patented Feb. 24, 1970

3,497,526
ORGANO-METALLIC COMPOUNDS
John Martin Chemerda, Watchung, and Meyer Sletzinger, North Plainfield, N.J., assignors to Merck & Co., Inc., Rahway, N.J., a corporation of New Jersey
No Drawing. Filed July 26, 1967, Ser. No. 656,069
Int. Cl. C07d 27/56; C07f 3/06; A61k 27/00
U.S. Cl. 260—326.13                                    2 Claims

ABSTRACT OF THE DISCLOSURE

Organo-metallic compounds which comprehend Grignard reagents. These compounds are precursors of 1-p-chlorobenzoyl-2-methyl-3-indolylacetic acids which have anti-inflammatory, analygesic and anti-pyretic characteristics.

---

This invention relates to a new method of preparing certain 1-p-chlorobenzoyl-2-methyl-3-indolylacetic acid derivatives and intermediates therefor. More particularly, it relates to a method of preparing certain 3-indolylacetic acids of the formula:

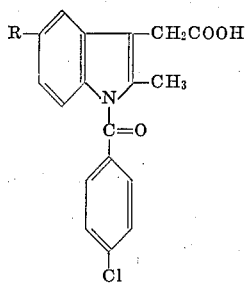

(I)

wherein R is methoxy or dimethylamino. These compounds are disclosed and claimed in U.S. Patent 3,161,654, issued Dec. 15, 1964, to Shen.

In the Shen patent, 1-p-chlorobenzoyl-2-methyl-3-indolylacetic acids of Formula I are prepared by a series of reactions in which a 2-methyl-5-R-3-indolylacetic acid (wherein R is as defined above) is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new process and new intermediates for the preparation of these compounds.

It has now been discovered in accordance with the present invention that 1-p-chlorobenzoyl-2-methyl-5-R-3-indolylacetic acids of Formula I can be prepared by hydrolysis of a compound of the Formula II:

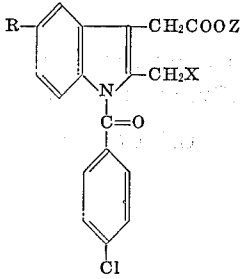

(II)

wherein X is MY or M'; Y is either chloro, bromo or iodo; M is magnesium or zinc; M' is sodium, potassium or lithium; and Z is H, M/2 or M'.

The materials of Formula II which are convertible to 1-p-chlorobenzoyl-2-methyl-5-R-3-indolylacetic acids are organo-metallic compounds which comprehend Grignard reagents and other organo-metallic compounds whose behavior is similar to Grignard reagents with respect to hydrolytic conditions. Thus, when X in the compound of Formula II is equal to MY and Y is equal to chloro, bromo, iodo, the Grignard reagent which is involved will, upon contact with water or dilute acid, form a methyl radical in the 2-position. At the same, the radical Z, if it is a metal, will be hydrolyzed so that the free acetic acid side chain is produced in the 3-position. Other organo-metallic groups which react similarly can be prepared from zinc, sodium, potassium or lithium in the same manner in which the Grignard reagent is prepared.

To prepare the organo-metallic derivative of Formula II, a compound of the Formula III:

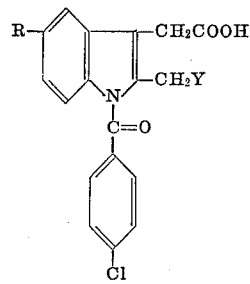

(III)

wherein Y is as hereinbefore defined, is dissolved in an ether such as ethyl ether, dioxane or, preferably, tetrahydrofuran. To the solution is added the metal corresponding to the desired organo-metallic intermediate. Thus, one can add zinc, an alkali metal or magnesium. The reaction should be conducted under anhydrous conditions. Although the organo-metallic compound can be formed without heating, it may be necessary to heat mildly in order to complete the reaction to form the organo-metallic intermdeiate.

In general, more than one mole of the metal per mole of the indole compound will be needed so that some of the metal may be used to form the salt of the acetic acid side chain.

When the organo-metallic intermediate of Formula II has been formed by the above procedure, it can be readily converted to the desired 1-p-chlorobenzoyl-2-methyl-5-R-3-indolylacetic acids by simple hydrolysis. The hydrolysis can be effected at room temperature or with slight heating using water or dilute acid such as dilute hydrochloric acid or dilute acetic acid. In general, it will be necessary to add two moles of acid for each mole of the organo-metallic material to hydrolyze both the organo-metallic side chain to a methyl and the acetic acid salt to the free acid. When the addition of water or acid is complete, the desired product, i.e., 1-p-chlorobenzoyl-2-methyl-5-methoxy-3-indolylacetic acid or 1-p-chlorobenzoyl-2-methyl-5-dimethylamino-3-indolylacetic acid, can be isolated from the reaction mixture by filtration and purified, if desired, by crystallization from an alkanol such as t-butanol.

The halomethyl starting materials of Formula III can be obtained by treating a 1-p-chlorobenzoyl-2-tosyloxymethyl-5-R-3-indolylacetic acid with a lithium halide (e.g., the chloride, bromide or iodide) in a solvent such as acetone. The 2-tosyloxy derivatives are disclosed and claimed in commonly assigned copending application U.S. Ser. No. 656,038 filed July 26, 1967.

The following examples are presented to further illustrate the present invention.

EXAMPLE 1

A solution of 1-p-chlorobenzoyl-2-tosyloxymethyl-5-methoxy-3-indolylacetic acid (0.1 equivalent) in 100 ml. of acetone containing 0.1 equivalent of lithium chloride was stirred for 48 hours at 25° C. The reaction mixture was concentrated in vacuo and the residue taken up in ether and filtered. The filtrate on concentration gives 1-p-chlorobenzoyl-2-chloromethyl - 5 - methoxy - 3 - indolylacetic acid.

The 2-bromomethyl and 2-iodomethyl derivatives are similarly obtained using lithium bromide and iodide, respectively, in the foregoing procedure.

EXAMPLE 2

A solution of 1-p-chlorobenzoyl-2-tosyloxymethyl-5-dimethylamino-3-indolylacetic acid (0.1 equivalent) in 100 ml. of acetone containing 0.1 equivalent of lithium chloride was stirred for 48 hours at 25° C. The reaction mixture was concentrated in vacuo and the residue taken up in ether and filtered. The filtrate on concentration gives 1 - p - chlorobenzoyl - 2 - chloromethyl - 5 - dimethylamino-3-indolylacetic acid.

The 2-bromomethyl and 2-iodomethyl derivatives are similarly obtained using lithium bromide and iodide, respectively, in the foregoing procedure.

EXAMPLE 3

To a solution of 3.93 g. (0.01 mole) of 1-p-chlorobenzoyl-2-chloromethyl-5-methoxy-3-indolylacetic acid in 50 ml. of dry tetrahydrofuran is added dropwise a solution of 0.01 mole of methyl magnesium iodide in tetrahydrofuran with exclusion of moisture. Then 3 g. of magnesium turnings are added. The mixture is stirred until no more magnesium is dissolved. The mixture is then filtered to give the product, the magnesium salt of 1-p-chlorobenzoyl - 2 - chloromagnesiomethyl - 5 - methoxy-3-indolylacetic acid.

EXAMPLE 4

To a solution of 0.01 mole of 1-p-chlorobenzoyl-2-chloromethyl-5-dimethylamino-3-indolylacetic acid in 50 ml. of dry tetrahydrofuran is added dropwise a solution of 0.01 mole of methyl magnesium iodide in tetrahydrofuran with exclusion of moisture. Then 3 g. of magnesium turnings are added. The mixture is stirred until no more magnesium is dissolved. The mixture is then filtered to give the product, the magnesium salt of 1-p-chlorobenzoyl-2-chloromagnesiomethyl - 5 - dimethylamino - 3 - indolylacetic acid.

EXAMPLE 5

Following the procedure of Example 3 except for the substitution of sodium for the magnesium used in Example 3, there is obtained the compound, the magnesium salt of 1-p-chlorobenzoyl-2-sodiomethyl-5-methoxy-3-indolylacetic acid.

In a similar manner, the corresponding zinc, lithium, or potassium compounds can be obtained following the procedure of Example 3.

EXAMPLE 6

Following the procedure of Example 4 except for the substitution of sodium for the magnesium used in Example 4, there is obtained the compound, the magnesium salt of 1-p-chlorobenzoyl-2-sodiomethyl-5-dimethylamino-3-indolylacetic acid.

In a similar manner, the corresponding zinc, lithium, or potassium compounds can be obtained following the procedure of Example 4.

EXAMPLE 7

The filtrate from Example 3 containing the Grignard reagent, the magnesium salt of 1-p-chlorobenzoyl-2-chloromagnesiomethyl - 5 - methoxy - 3 - indolylacetic acid, is treated slowly with 10 ml. of dilute hydrochloric acid to convert the organo-metallic group at the 2-position to a methyl group. When the addition of the acid is complete, water is added to precipitate the product, 1-p-chlorobenzoyl-2-methyl-5-methoxy - 3 - indolylacetic acid. This solid is filtered off and purified by crystallization from t-butanol.

EXAMPLE 8

The filtrate from Example 4 containing the Grignard reagent, the magnesium salt of 1-p-chlorobenzoyl-2-chloromagnesiomethyl - 5 - dimethylamino - 3 - indolylacetic acid, is treated slowly with 10 ml. of dilute hydrochloric acid to convert the organo-metallic group at the 2-position to a methyl group. When the addition of the acid is complete, the pH is adjusted to 5 by addition of aqueous base to precipitate the product, 1-p-chlorobenzoyl-2-methyl-5-dimethylamino-3-indolylacetic acid. This solid is filtered off and purified by crystallization from t-butanol.

EXAMPLE 9

Following the procedure of Example 7, the sodium, lithium, potassium and zinc compounds prepared in Example 5 are converted to the product, 1-p-chlorobenzoyl-2-methyl-5-methoxy-3-indolylacetic acid.

EXAMPLE 10

Following the procedure of Example 8, the sodium, lithium, potassium and zinc compounds prepared in Example 6 are converted to the product, 1-p-chlorobenzoyl-2-methyl-5-dimethylamino-3-indolylacetic acid.

We claim:
1. A compound of the formula:

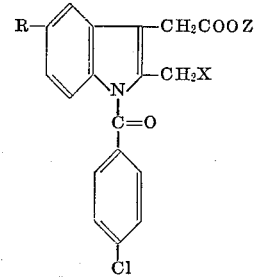

wherein R is methoxy or dimethylamino; X is MY or M′; Y is either chloro, bromo or iodo; M is magnesium or zinc; M′ is sodium, potassium or lithium; and Z is hydrogen, M/2 or M′.

2. The compound of claim 1 wherein R is methoxy.

References Cited

UNITED STATES PATENTS 3,161,654  12/1964  Shen _____ 260—326.12

OTHER REFERENCES

Noller, Chemistry of Organic Cpds. (1965), pp. 124–25, pp. 128–129.

ALEX MAZEL, Primary Examiner

J. A. NARCAVAGE, Assistant Examiner

U.S. Cl. X.R.

260—326.14